Jan. 11, 1966     G. A. KANE ETAL     3,228,295

GUIDED MISSILE LAUNCHING SYSTEM

Filed March 7, 1963     17 Sheets-Sheet 2

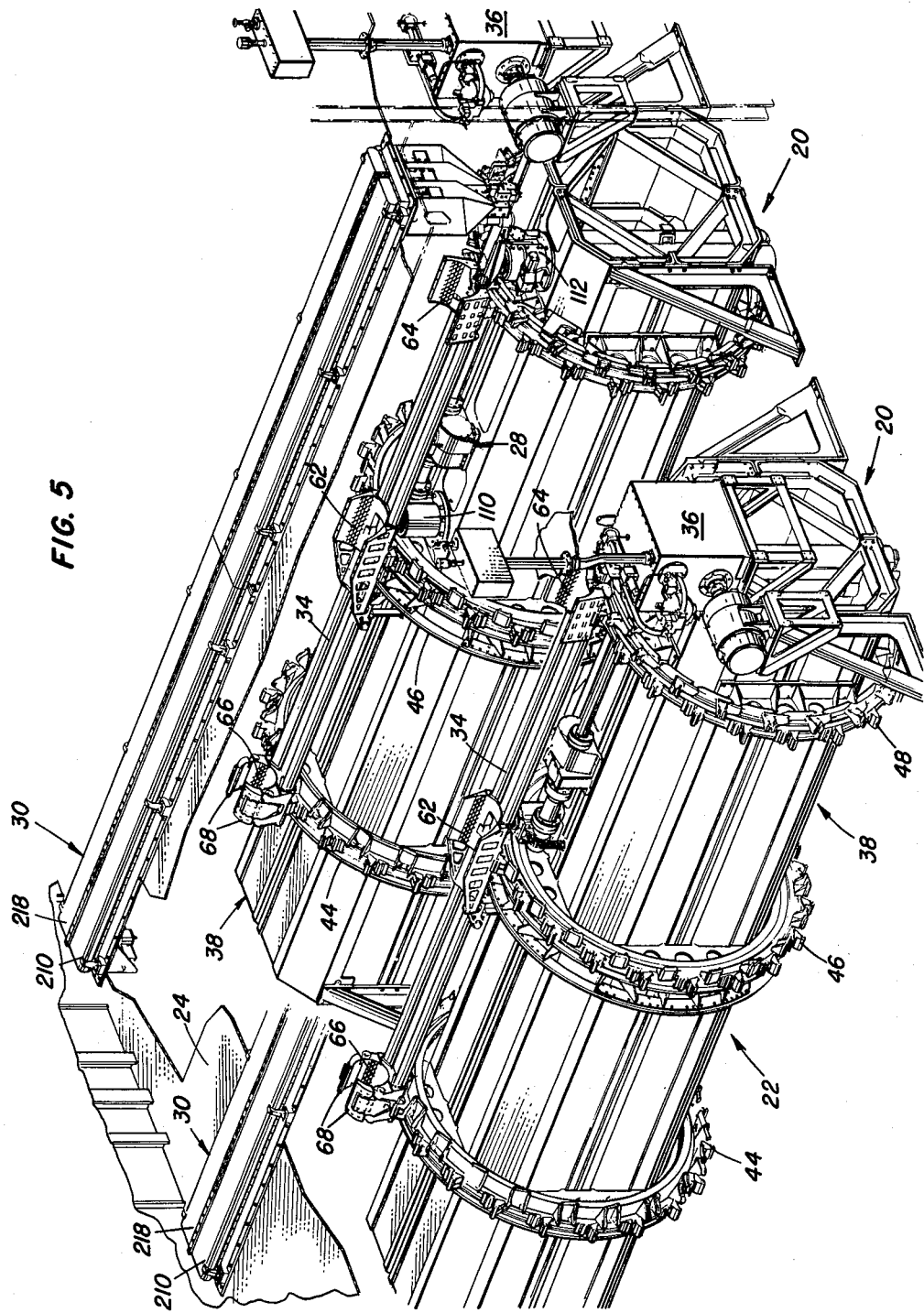

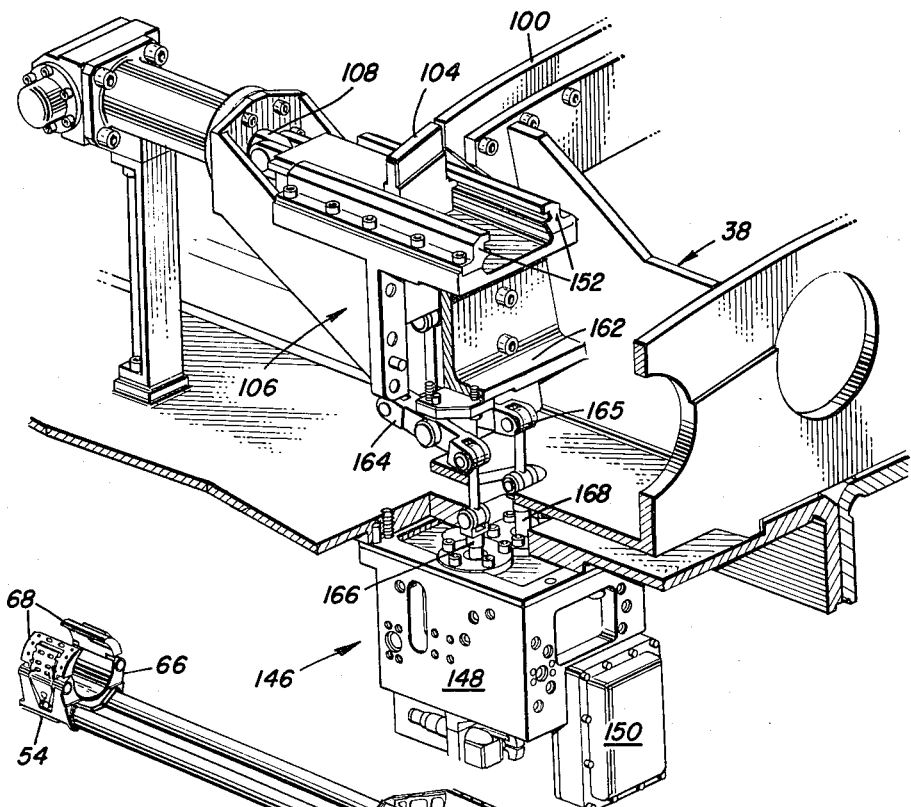
FIG. 8
FIG. 9
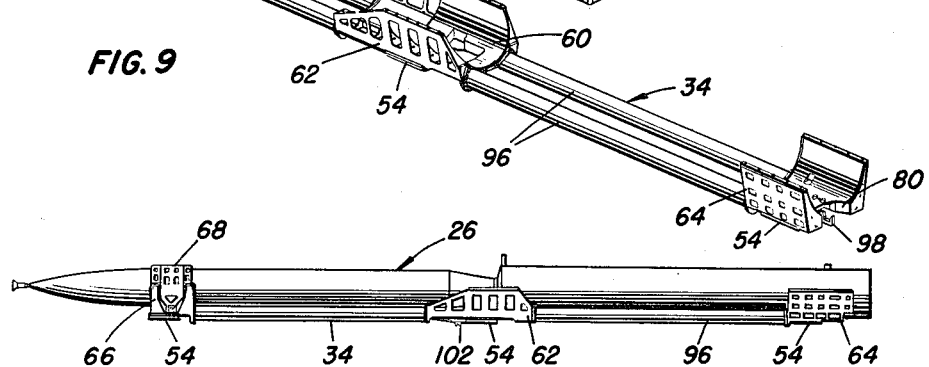
FIG. 10

FIG. 18
FIG. 19
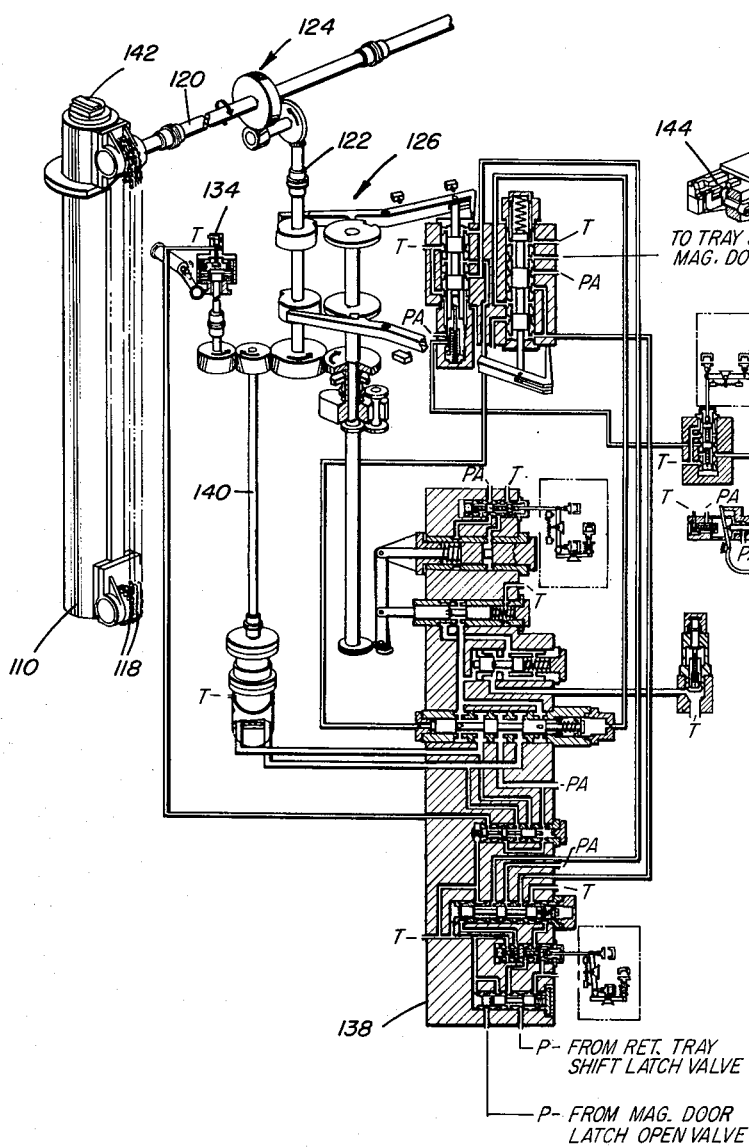
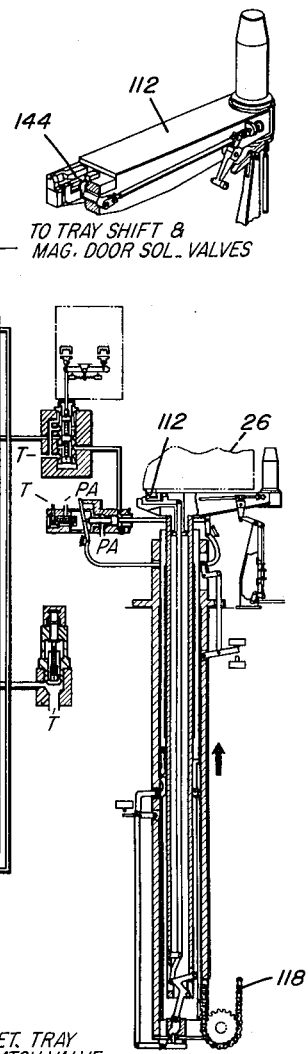

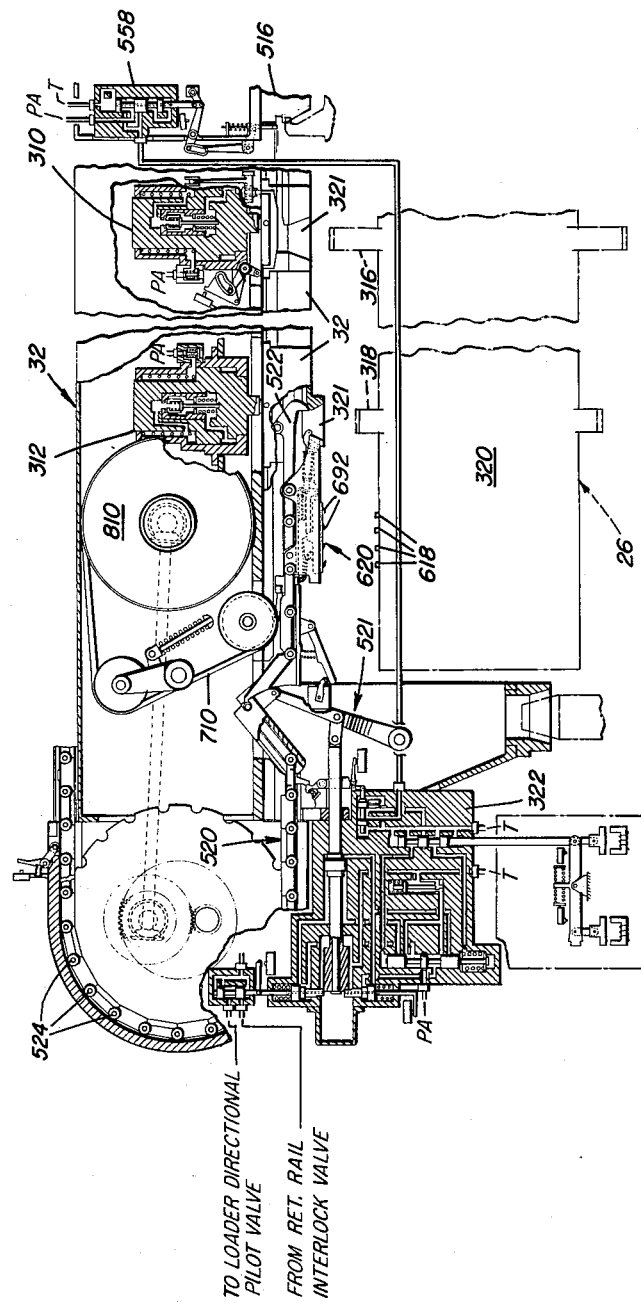

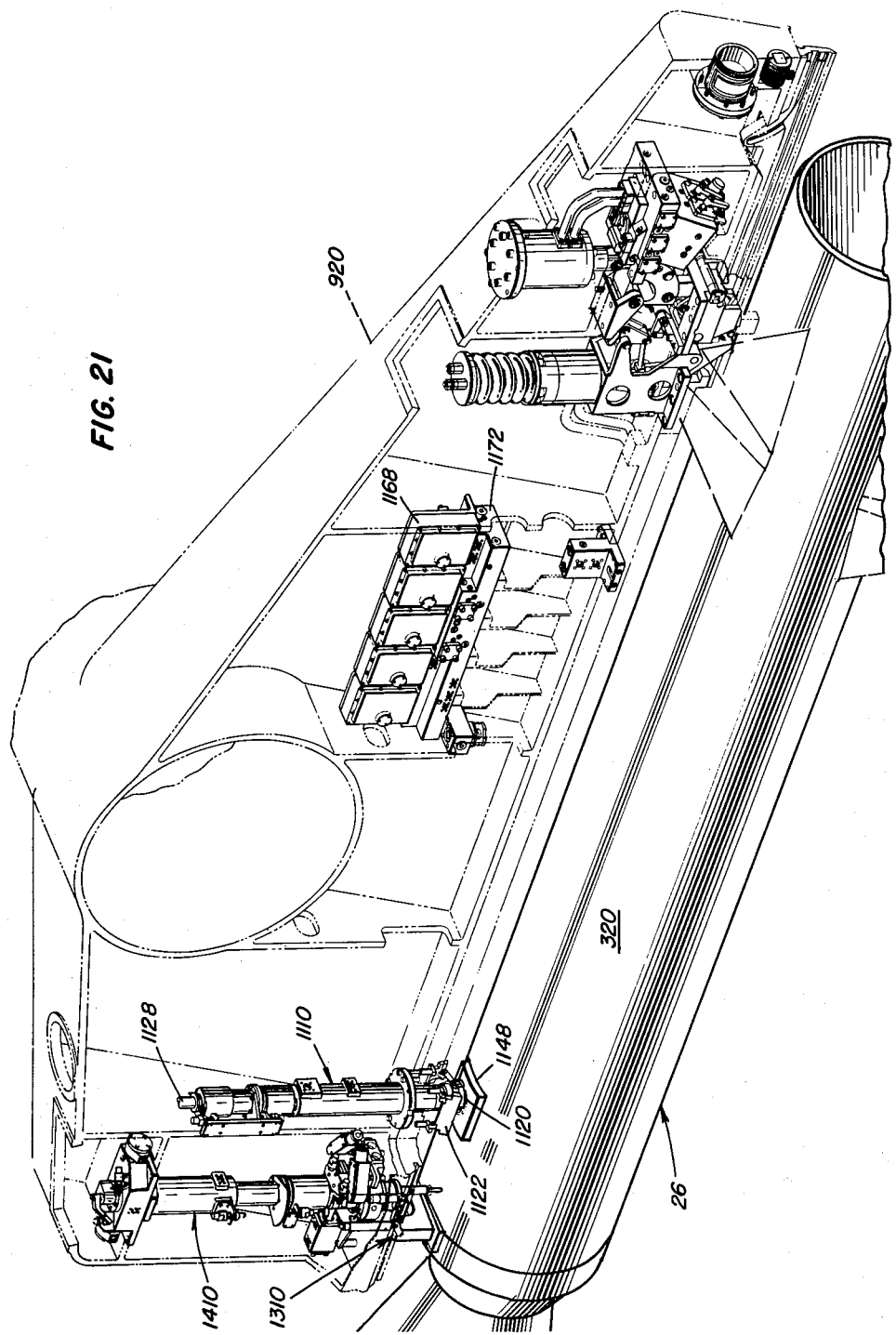

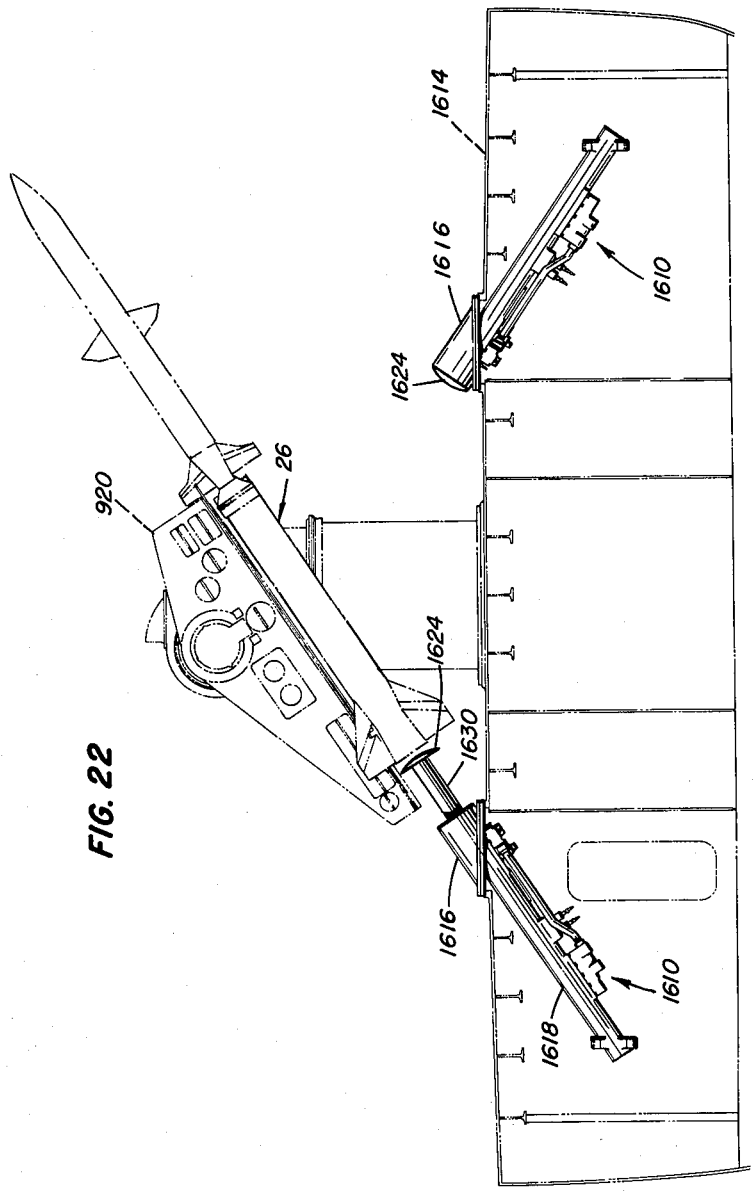

United States Patent Office 3,228,295
Patented Jan. 11, 1966

3,228,295
GUIDED MISSILE LAUNCHING SYSTEM
Garold A. Kane and Harrison Randolph, Minneapolis, Minn., Robert E. Carlberg, McLean, Va., John S. Scheurich, Palmer G. Wermager, and Arthur G. Blomquist, Minneapolis, Minn., Robert L. Kossan, Adelphi, and Martin J. Clune, Hyattsville, Md., assignors, by direct and mesne assignments, to the United States of America as represented by the Secretary of the Navy
Filed Mar. 7, 1963, Ser. No. 265,581
1 Claim. (Cl. 89—1.7)

This invention relates generally to ordnance weapon handling and launching systems, and more particularly to systems for handling and launching guided missiles.

Although this invention is particularly advantageous for transporting, handling, and launching missile weapons from movable installations, such as naval vessels, it is not limited thereto, as it most readily can be adapted for use in fixed installations, such as land base missile launching systems.

Guided missiles, particularly those of a supersonic type, serve well as weapons. However, because of their size and weight, some means must be provided for rapidly and accurately launching these missiles in order that they will be effective.

Any handling and launching system for ordnance weapons which is designed for repetitive use is made up of several major components, including a launcher, magazines for storage of weapons, and a feeder mechanism for transporting the weapons from the magazine to the launcher.

It is an object of this present invention, therefore, to provide transporting, handling, and launching system for ordnance weapons which can be used effectively to automatically transport, handle and launch weapons, either singly or in pairs.

Another object of this invention is to provide a system for handling weapons of different types in which mechanisms are provided for selectively cycling the plurality of weapons of different types for selection of any one thereof, together with other mechanisms for receiving and moving the selected one of the weapons for further disposition thereof.

Another object of this invention is to provide a weapons handling system to selectively load one of an assortment of weapons, and transport the selected weapon of said assortment of weapons for further disposition thereof.

Another object of this invention is to provide a pair of spaced stations for selectively loading and receiving, respectively, ordnance weapons of different types, together with means for transporting selected types of ordnance weapons in either direction between such stations.

Still another object of this invention is to provide ring type ready service mechanisms, including an arrangement for stowing a plurality of ordnance weapons of one or more types in an enclosed ballistically protected compartment in combination with a feeder system for feeding any one of a selected one of said ordnance weapons to a dual type launcher for launching the weapons therefrom.

Still another object of this invention is to provide an arrangement for use with a ring type ready service device for indexing and hoisting a selected weapon to a position below a feeder system for transfer thereto of the weapon for subsequent feeding thereof to a dual launcher.

To provide a ballistically and blast protected structure for protection of an assembly compartment for missiles from an adjacent launching arrangement, including blast doors positioned in the structure to provide for the passage of a missile through the openings in the structure when being transferred to the dual launcher for launching therefrom, is still another object of this invention.

Another object of this invention is to provide span track arrangements affixed to and cooperating with spaced dual blast doors to form extensions of the feeder system to the dual launcher when the blast door arrangements are in an open position.

Another object of the present invention is to provide a dual type launcher having spaced guide arms positioned on the launcher to align with the span tracks from the spaced blast doors to form a longitudinal extension of the feeder system and the span tracks for transferring missiles from a stowage area to the launcher for launching therefrom, either singly or dually.

To provide an enclosed ballistically protected shipboard compartment, including ready service ring arrangements for stowage of a plurality of missiles of one or more types and for selectively cycling in either a clockwise or counterclockwise direction the stowed missiles for selection of any one thereof for transfer to a launcher, is another object of this invention.

To provide a dual feeder system for feeding a plurality of missiles of different types from a pair of ready service ring type mechanisms to a dual launcher for launching therefrom, is yet another object of this invention.

To provide a guided missile launching system comprising a dual feeder system for feeding a plurality of missiles of different types to a dual launcher for launching therefrom, either singly or in pairs, together with automatic mechanical, hydraulic and electrical sequence control mechanisms for controlling the loading operations of the missiles simultaneously in the dual feeder system, is a further object of this invention.

Another object of this invention is to provide an arrangement for use with the dual feeder system for automatic mechanical, hydraulic and electrical sequence control of all load operations on either loader rail of the feeder system independently of the other except for assembly of aerodynamic surfaces, such as wings and fins, to the missile and except for remote fire control of the missiles.

The foregoing and other objects and attendant advantages of this invention will become more readily apparent and understood from the following detailed specification and accompanying drawings in which:

FIG. 4 is a schematic end view of the hoist or load stations for the ready service rings;

FIG. 5 is an enlarged diametric view, partly broken away, of the missile magazine of the guided missile launching system illustrated in FIG. 1;

FIG. 8 is a diametric view of a tray shift mechanism;

FIG. 9 is a diametric view of a tray assembly;

FIG. 10 is a side elevation of a tray assembly having a missile-booster combination positioned therein;

FIG. 18 is a hydraulic schematic of the hoist for the ready service ring shown in its extension cycle;

FIG. 19 is a detail depiction of the aft shoe hoist;

FIG. 20 is a schematic diagram of the positioner area of the tramway type loader utilized in this invention;

FIG. 21 is a skeletonized cutaway of the launcher guide arm showing the missile contactor, booster contactor, arming device and latch mechanism; and FIG. 22 is a vertical elevation, partly in section, of a general shipboard installation of a pair of dud jettison units with their associated missile launcher.

Figure 1:
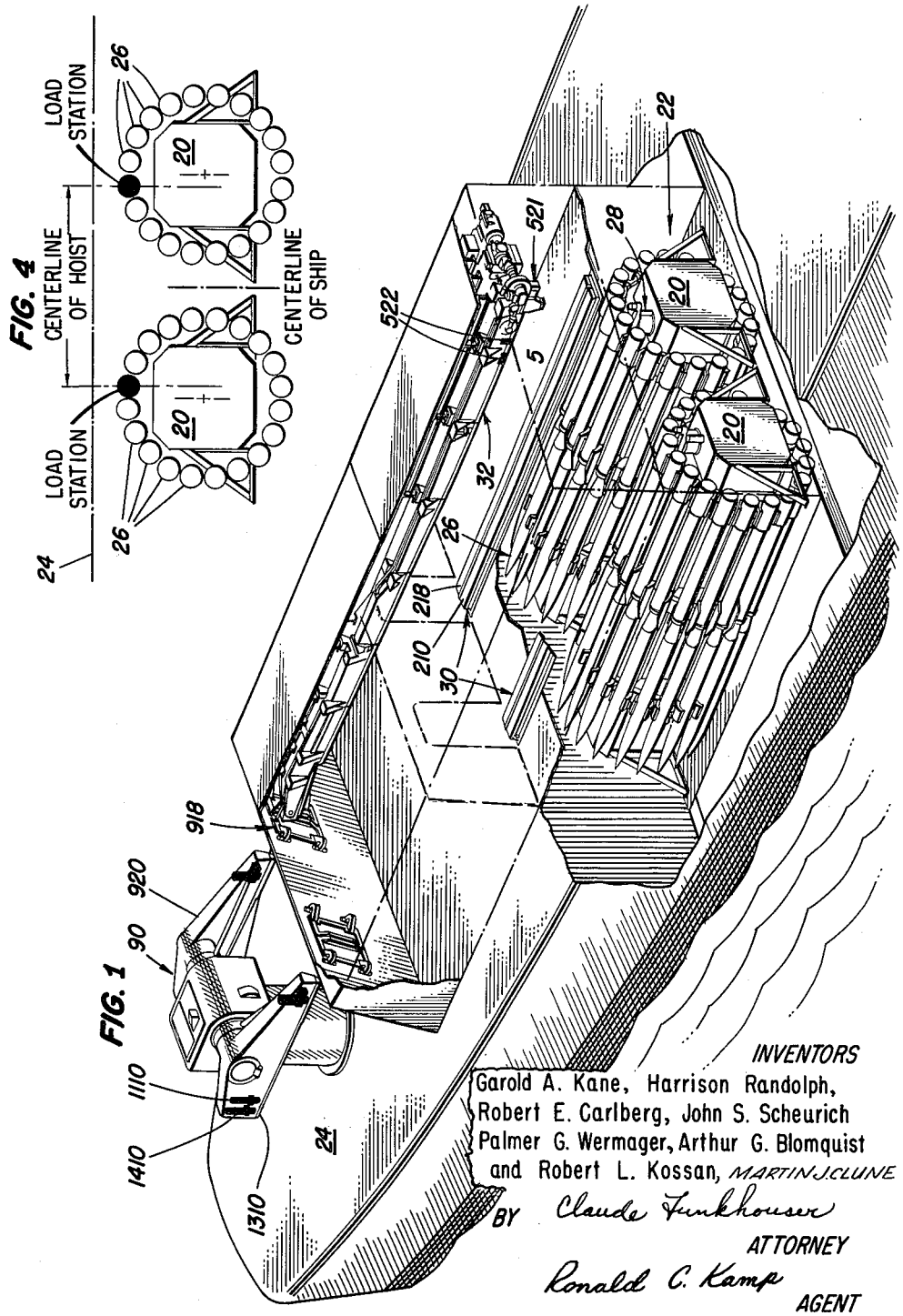
FIG. 1 is a dimetric view of the guided missile launching system, partly broken away, and with one conveyor trunk removed for clarity.

Briefly described and in the embodiment disclosed, the guided missile launching system is located on a ship with the missile launcher being mounted in an exposed position on the main deck.

Except for right- and left-hand differences, the two longitudinal halves of the system are similar in design and identical in operation.

The two sides of the system are called the A and B sides. The A and B sides of the launcher feeder operate simultaneously but independently. If a casualty occurs to one side, the other side can operate at full capacity. On orders received from the Weapons Control Station, the launching system panel operator can select A side only, B side only, or A and B sides simultaneously.

A missile launcher feeder, which is part of the missile launching system, has part of its components mounted on the main deck or between the main deck and the deck immediately thereabove. These components are enclosed by a deckhouse on the ship. The rest of the feeder components are located below the main deck. The deckhouse is divided into two compartments by a vertical bulkhead. The forward compartment is designated as the Wing and Fin Assembly Area, and the aft compartment is referred to as the Strikedown and Checkout Area. The area below the main deck is designated the Missile Magazine Area.

The Magazine Area is located below the Assembly Area and provides for ready service stowage of a plurality of mated missile-booster combinations. The missile-booster combinations referred to hereinafter as simply missiles are supported in individual trays. These different missile-booster combinations are designated as X, Y, or Z weapons on selected panels. When the missiles are stowed in the magazine, they are not equipped with wings and fins. The Magazine Area contains the ready service mechanisms each of which includes the ready service ring, a magazaine accumulator system and a load status recorder, the hoist mechanisms, and the magazine doors.

The magazine accumulator system is installed on brackets on the bulkhead at the booster end of the ready service ring. The accumulators are mounted inside the truss forward of the aft bearing assembly. The major components of the magazine accumulator system are the induction motor, the accumulator, the accumulator bypass valve block, the high pressure accumulator pump, the suction screen, the gear reducer, the header tank, the magazine accumulator control and the oil filter.

Each ready service ring has an indexing mechanism which permits the plurality of trays to be moved either clockwise or counterclockwise to the transfer position directly above the hoist. The hoist mechanism, located inside the truss, lifts a missile to the loader rail. After the missile has been captured by the loader pawl, the wings and fins are installed by the wing and fin assembly crew, as will be mentioned later more in detail.

Each missile is held in its tray by two shoes each and a mechanically operated clamp at its forward end.

The ready service ring can be indexed one station at a time when the transfer station is empty and the adjacent station is loaded with a missile of the desired type. But if the desired type missile-booster combination is at some other station, the ready service ring will rotate either clockwise or counterclockwise until the nearest tray with the desired type missile is at the transfer station. Since the ring may carry different types of missiles, the desired type may be brought to the transfer station by switching at Weapons Control or on the control panels. When in step control, the ready service ring may be stopped at any station.

The ready service ring drive consists of a gear reduction, B-end, a power-off brake and a control. The magazine accumulator system supplies accumulator pressure, PA, to the B-end. The power-off brake secures all moving parts of the ring, both loaded and unloaded, when the power is off. In case of emergency, the ready service ring can be moved by means of a handcrank attached to the power-off brake. No electric warmup power is supplied to the missiles on the ready service ring.

The main components of both A- and B-side ready service rings are the truss bearing ring assemblies, the ready service trays, and electrical and hydraulic equipment. Depending on the tactical requirements, the ready service ring will provide stowage for different types of weapons at one time which can be loaded in any order.

The load status recorder is located behind the aft bearing assembly on top of the truss and is capable of three indications, namely loaded or empty; operational or dud; and type of missile.

Upon receipt of missile-type designation and load orders from the Weapons Control Station (WCS), launching system operation is initiated. The designated type weapons are selected from the magazine and moved vertically to the assembly area. In the assembly area, launcher system personnel assemble the wings and fins to the missile-booster combination. When wing and fin assembly has been completed, the weapons are moved toward the launcher and loaded thereon.

The launcher supports the weapons in the final stages of handling during which they are aimed and fired. During the movement of the weapon on the loader and while on the launcher, the launching system completes the required activation steps (warmup, booster arming, etc.) to assure that a functional weapon will be fired.

When the launcher is loaded and assigned or waiting assignment to a director, the feeder system continues to operate, as load orders may demand, until the feeder system functions have been completed. With continuous load orders in effect, some of the feeder system functions occur simultaneously with launcher functions. This assures a minimum loss of time between successive firing of missiles from the launcher.

The missile launching system can be operated in a number of modes. During normal tactical employment, the system automatically performs its functions on remote orders from WCS.

If remote, load or missile select orders can be operated by the launching system panel operator from orders transmitted by telephone. Weapons positioned on the launcher ready for firing, or on the loader awaiting transfer to the launcher, may be returned to the magazine in automatic mode by the launching system panel operator upon remote orders from WCS.

A step control mode is provided for exercise and checkout of the system. In step control, the action of each component of the launcher feeder system is controlled by push-button switches on the launching system control panels. Weapons may be moved in "steps" from the magazine to the launcher or returned to the magazine from the launcher for equipment exercise and crew training purposes. Step control permits activation of a part of the system for checkout without activating the entire system. Step control must be used during strikedown or checkout of missiles and boosters. A test panel permits "local control" of the launcher. Checkout and test procedures on the launcher are controlled from this test panel.

This system is capable of limited operation in a manual mode. The power drives of the launcher feed system provide for the attachment of handcranks for operating equipment driven by the power drives. The launcher feeder accumulator power drives have handpumps which may be used to produce sufficient hydraulic pressure to actuate latches and cylinders which are normally operated by accumulator system hydraulic pressure. Train and elevation drives of the launcher have permanently mounted air motors in place of handcranks for movement of the launcher in the manual mode. The launcher guide components have a handpump for manual operation. The manual mode is used during equipment installation and may be used for preliminary test or exercise to assure proper functioning of equipment before step or automatic operation is initiated. The manual mode may also be used in emergencies to secure equipment for personnel or ship safety when other modes of operation are not possible. The missile launching system is a dual system in that the launcher has two guide arms, each supporting a weapon. There are dual wing and fin assembly areas and dual loaders to convey the weapons from the assembly areas to the launcher.

In addition to normal operating functions, emergency functions have been provided to take care of dangerous or delaying situations caused by missile malfunctions. The normal firing of weapons is contingent upon a pattern of system and missile interlocks which prevent firing of a dud weapon. If the situation demands immediate disposal of a dud weapon on the launcher, WCS may bypass the missile interlocks and fire the dud through the dud firing circuit. A weapon so fired assumes flight without guidance. If launching a dud weapon would endanger surrounding vessels, or if the firing sequence is completed but the booster does not ignite (misfire), the dud jettison unit may be used to physically eject the weapon overboard.

When the first load cycle has progressed to the point where the first pair of missile-booster combinations are at the assembly area and the hoists have lowered, the second load cycle starts. The magazine indexes to place the type of missile-booster combinations designated for the second load cycle in loading position. The second load cycle holds at this point until the loader chain has returned to the assembly area and the pawl positioner has retracted. While launcher synchronization and firing of the first cycle continues, the second cycle missile-booster combinations are hoisted to the assembly area and wings and fins are attached.

The copending applications mentioned hereinafter are all assigned to the United States Government and the disclosures thereof are incorporated herein by reference. The specific structure disclosed in these referenced applications are intended to provide detail information relating to some of the sub-assemblies of the launching system disclosed and claimed herein.

Figure 2:
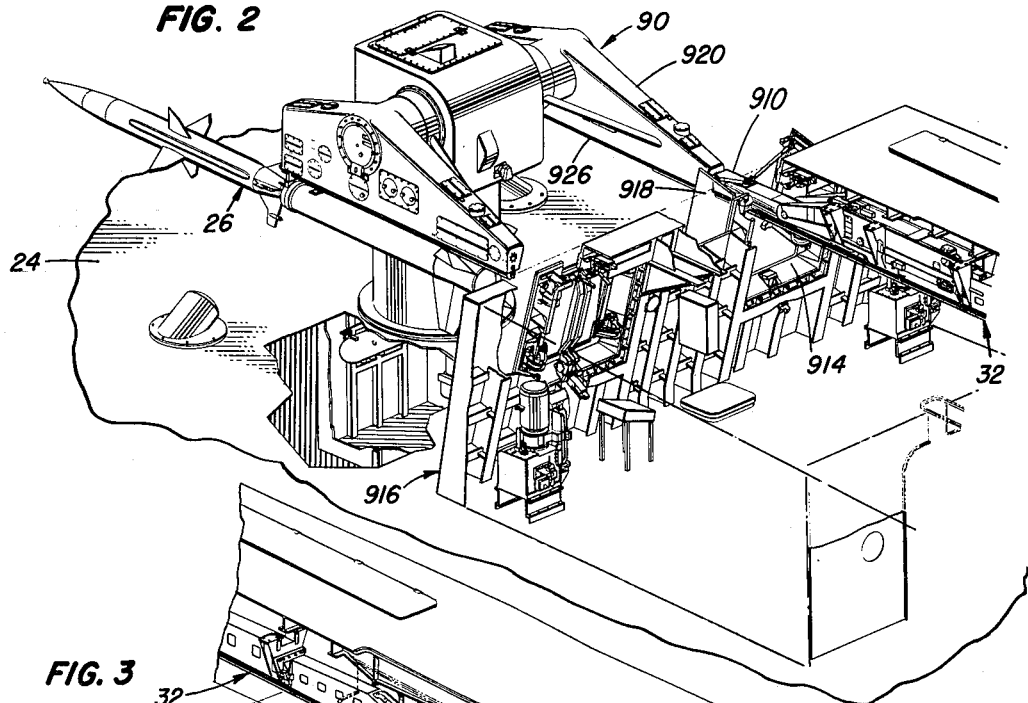
FIG. 2 is a diametric view of a portion of the guided missile launching system, partly broken away, and with one conveyor trunk removed for clarity, showing the launcher with a missile on one arm and the forward part of the loading system.
Figure 3:
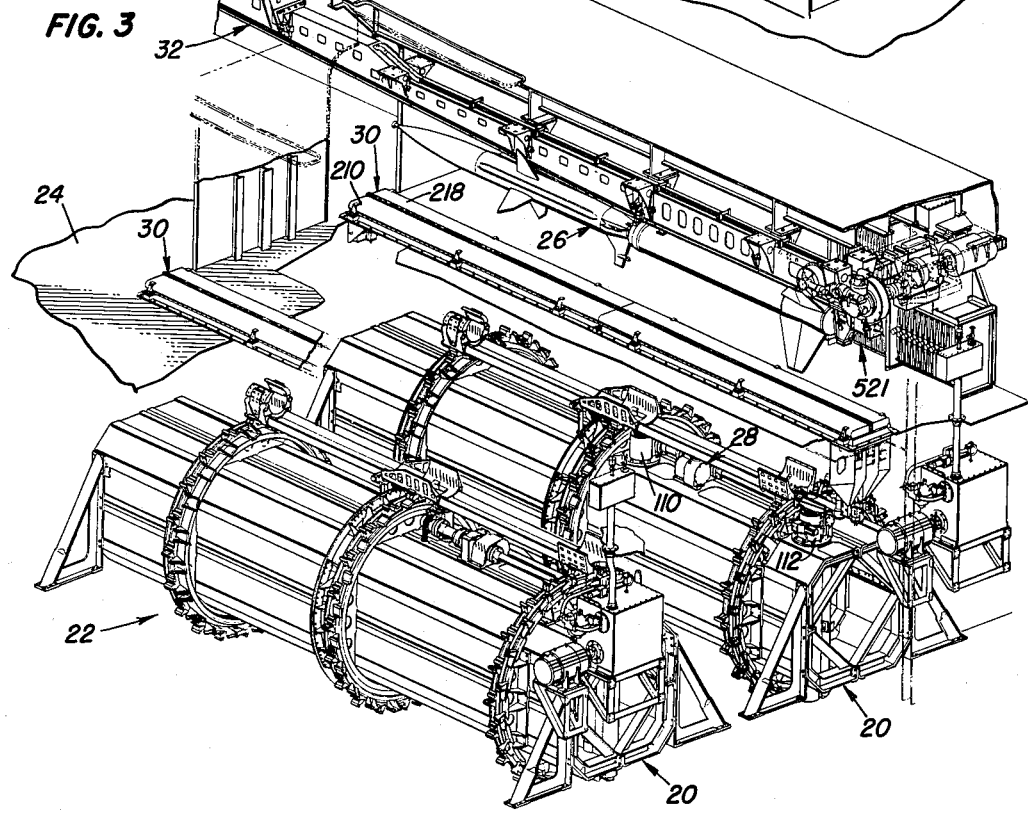
FIG. 3 is a diametric view of the aft portion of the loading system, partly broken away, and showing the magazine area containing the ready service rings.

Referring now to the details of the drawings, FIGS. 1, 2, and 3 show a typical shipboard arrangement for utilizing the guided missile launching system of this invention, including the ready service rings 20. A pair of these ready service rings 20 are located side by side in a magazine area 22 below the main deck 24 of a guided missile vessel. A plurality of missiles 26 are mounted around each ready service ring 20 and are arranged to be rotated therearound.

Each of the ready service rings 20 is provided with a built-in hoist system 28 which extends a pair of telescopic shoe hoists 110 and 112 to remove and lift a selected one of these missiles 26 through magazine doors 30 in the deck 24 to an overhead conveyor trunk 32 for delivery to a missile weapon launcher 90.

The missiles 26 are each retained and handled in a tray 34 as shown in FIGS. 9 and 10, and as further described and claimed in copending application Serial No. 248,822, filed December 31, 1962. For clarity, only one tray 34 is shown on each ready service ring 20 in FIG. 5. A hydraulic accumulator 36 powers the ready service ring 20 for shifting these trays 34 and indexing them in either direction around a central hollow frame or truss 38 and for powering the hoist system 28.

Figure 6:
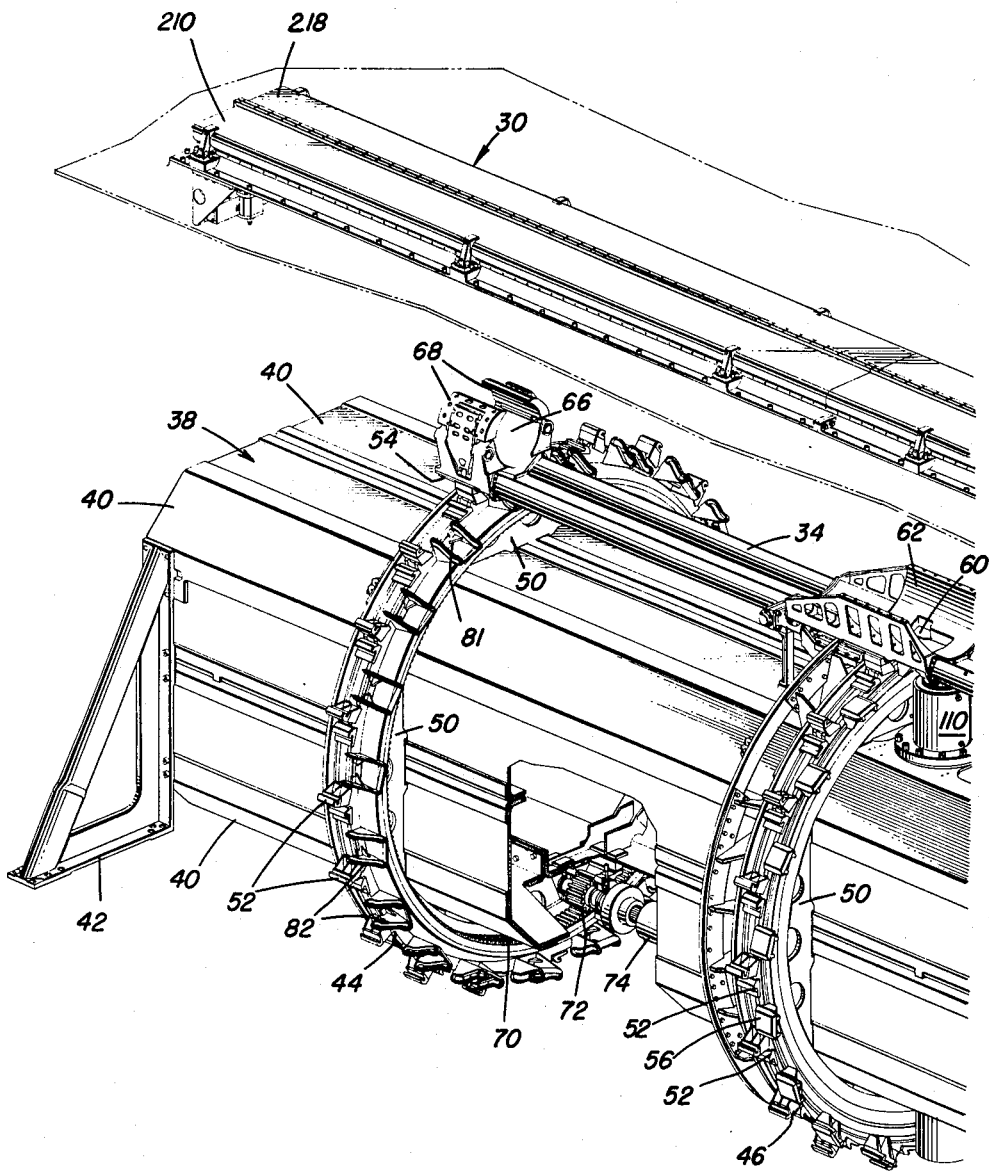
FIG. 6 is a partial view of one ready service ring and its associated drive mechanism system and magazine doors.
Figure 7:
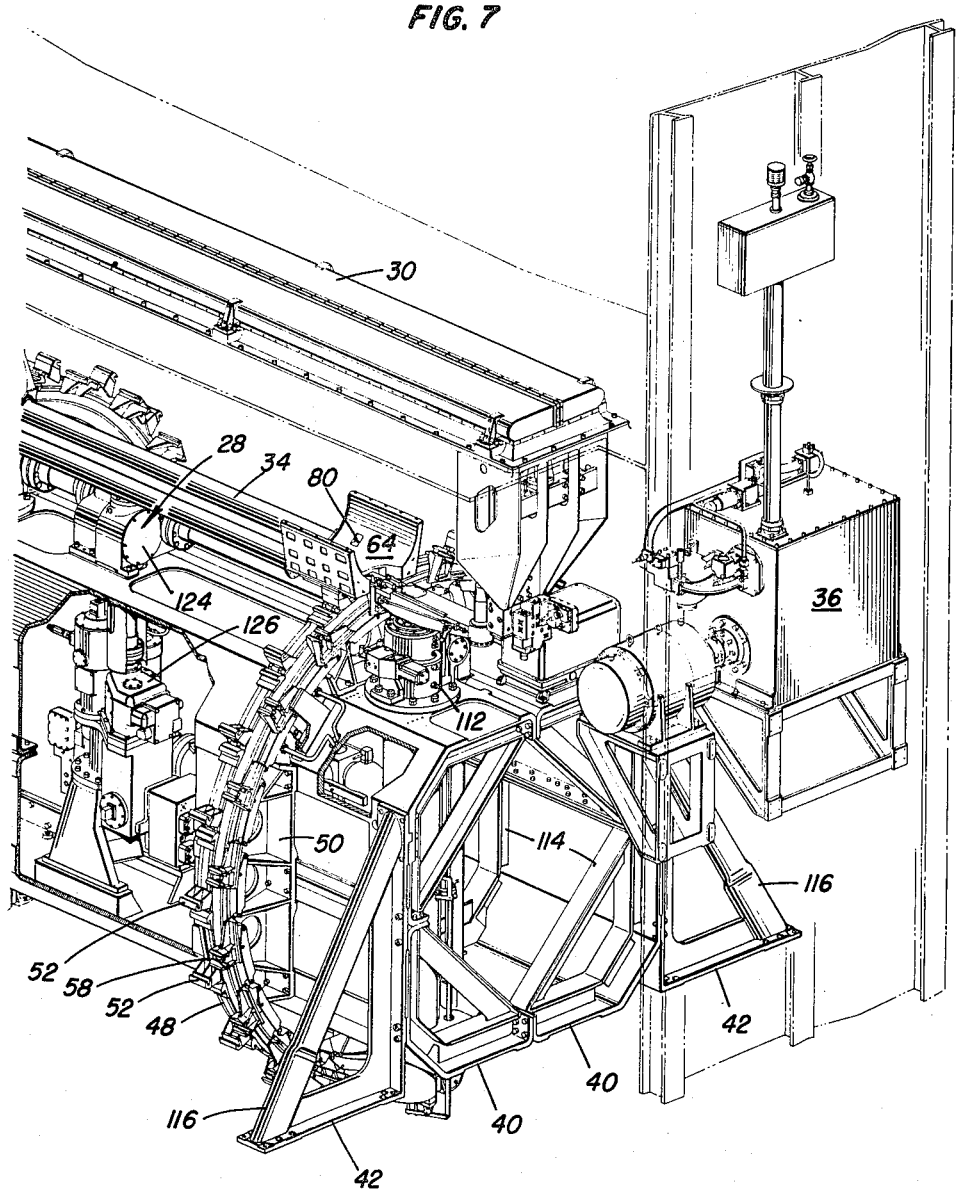
FIG. 7 is a continuation to the right of FIG. 6 and illustrates the associated accumulator system.

The truss 38 is formed by four long quadrant weldments 40 bolted together as shown in FIGS. 6 and 7. Each quadrant weldment 40 is provided with reinforcing struts 114 on the inside. The truss 38 is supported and secured in place at each end by two large right angle brackets 42 braced with tubular struts 116.

Three spaced bearing assemblies 44, 46, and 48 are mounted on the truss 38. The inner stationary portion of the bearing assemblies 44, 46, and 48 is secured to the truss 38 by semicircular brackets 50. The outer rotating portion of the bearing assemblies 44, 46, and 48 have a plurality of slide blocks 52 corresponding in number to the number of missiles on each ready service ring and which mate with slides 54 on the trays 34 and retain them on the ready service ring 20.

The right and left halves of the slide blocks 52 are of unequal height and shape because the line of missile transfer is intentionally displaced from the vertical center line of the ready service ring 20 and hence the trays 34 cannot be located tangential to the circumference of the bearing assemblies 44, 46, and 48.

A forward booster shoe bracket 56 is mounted between each pair of tray slide blocks 52 on the center bearing assembly 46 and an aft booster shoe bracket 58 is similarly mounted on the aft bearing assembly 48. The booster shoes of the missile-booster combination 26 extend through cutouts 60 and 80 in the center and aft tray saddles 62 and 64, respectively, of the tray 34 to engage brackets 56 and 58 and retain the missile-booster combination 26 in the tray 34 on the ready service ring 20.

The rotating portion of the forward bearing assembly 44 is provided with cam brackets each having a pair of cam slots 81 therein and mounted between the tray slide blocks 52. During fore and aft shifting of a tray 34, more fully described hereinafter, a pair of rollers mounted on an arm which pivots from the under side of a forward saddle 66 rolls in and is actuated by the cam slots 81 to close or open its forward saddle clamp 68.

The rotating portion of each of the end bearing assemblies 44 and 48 includes an involute ring gear 70 driven by a stationary pinion gear 72, shown best in FIG. 6. The two pinion gears 72 are connected by coupling drive shafts 74 below the truss 38 and to a gear reduction assembly 76 shown in detail in FIG. 11.

The gear reduction assembly 76 is mounted inside the truss 38 between the center and aft bearing assemblies 46 and 48 and is driven by the output shaft 94 of an accumulator-powered B-end 78. A ring drive power-off brake 83 having a hand crank 84 for manual rotation of the ready service ring 20 is mounted on the top of the gear reduction assembly 76. A control valve block, not shown, with solenoid operated valves and a drive control unit is mounted on the forward side.

Figure 14:
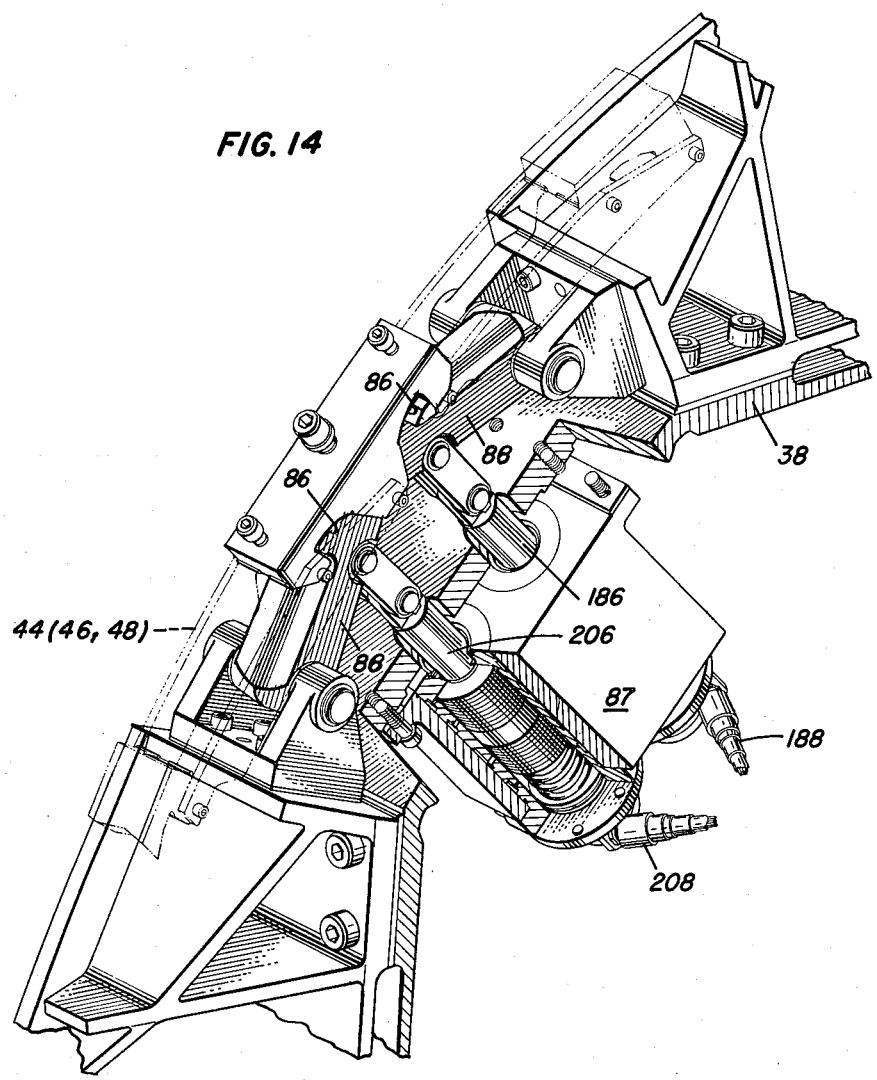
FIG. 14 is a detail view of the ready service ring positioning latch assembly.

As shown in FIG. 14, the rotating portion of each bearing assembly 44, 46, and 48 is provided with a pair of index notches 86 corresponding to each tray position of the ready service ring 20. Indexing or rotation may be clockwise or counterclockwise to bring any desired tray 34 into hoist position or load station as shown in FIG. 4. Hydraulically actuated index latches 88 mounted in the truss 38 at each bearing assembly 44, 46, and 48 engage the index notches 86 and lock the ready service ring 20 in the indexed position.

As previously mentioned and as shown in FIG. 4, the hoist station is displaced from top center and in the direction of the centerline of the vessel on both ready service rings 20. That is to say, the pairs of ready service rings 20 are constructed and assembled as right and left units in this respect only. As a result, the conveyor trunks 32 can be mounted closer together than the centerlines of the ready service rings 20 to match the width of the missile weapon launcher 90 and to conserve space.

As shown best in FIGS. 9 and 10, each tray 34 of each ready service ring 20 includes a center, aft, and forward saddle 62, 64, and 66, respectively, secured together with two interconnecting tubular members 96 to form a rigid structure for handling and supporting the long missile-booster combinations 26. The center and aft saddles 62 and 64 support the booster portion of the missile-booster combination 26 at the forward and aft supporting shoe areas.

A hard spot near the warhead of the missile portion of the missile-booster combination is the support point in the forward saddle 66. The cam actuated clamp 68 of the forward saddle 66 prevents lateral movement of the missile end of the missile booster combination 26. The aft saddle 64 is provided with a hook 98 bolted to the bottom thereof.

When a missile-booster combination is positioned in the tray 34, this hook 98 engages the aft shoe of the booster and prevents longitudinal movement of the missile-booster combination 26 in the tray 34.

Each tray saddle 62, 64, and 66 is provided with a pair of slides 54 mounted on the bottom edges thereof. The engagement of the tray slides 54 with the bearing assembly slide blocks 52 retains the tray 34 on the ready service ring 20 but permits longitudinal movement thereof.

The center tray saddle 62 is provided with a transversely recessed vertical saddle projection 102 which is cast on the bottom thereof as shown in FIG. 10. A stationary ring 100, best shown in FIG. 8, is mounted on the truss 38 slightly forward of the center bearing assembly 46 and it engages the vertical saddle projection 102 and prevents longitudinal movement of the trays 34 at all index stations except the load or hoist station. At the load or hoist station a slidable segment 104 of the ring 100 is movably arranged to permit a tray shift assembly 106 to slide the tray 34.

This tray shift assembly 106 is mounted on the truss 38 at the load or hoist station and it is hydraulically operated. Extension of an operating piston 108, shown best in FIG. 8, move the segment 104 and the engaged tray 34 shifts to shoe hoists 110 and 112, shown in FIG. 12, of the hoist system 28.

When the tray 34 shifts to this hoisting position clamp 68 is cammed open and the booster shoes of the missile-booster combination 26 in the tray 34 are disengaged from the bearing assembly booster shoe brackets 56 and 58 and are engaged on the forward and aft shoe hoists 110 and 112, respectively. When the tray 34 shifts to ready service, the booster shoes are disengaged from the shoe hoists 110 and 112 and are engaged to the bearing assembly forward and aft booster shoe brackets 56 and 58, and the clamp 68 is closed around the missile.

Figure 12:
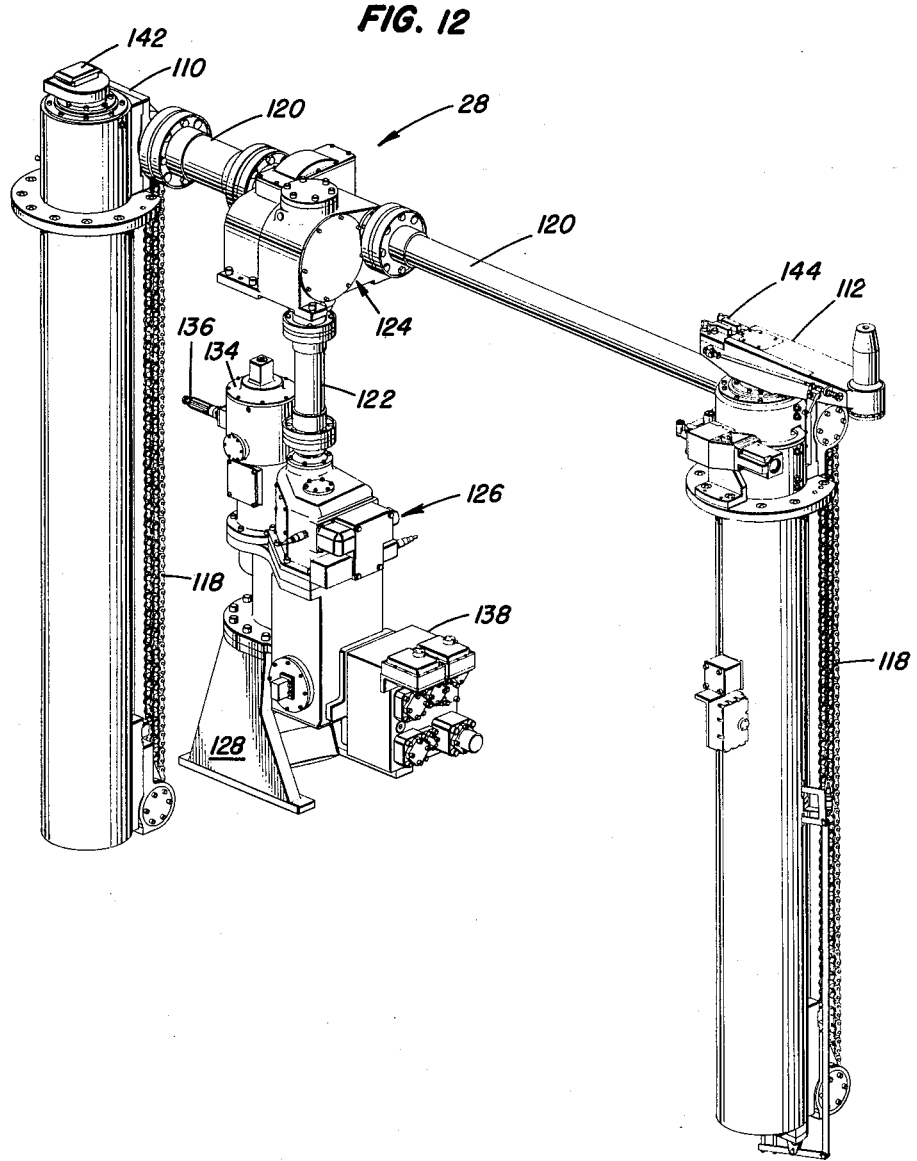
FIG. 12 is a diametric view of a hoist mechanism for the ready service ring.
Figure 13:
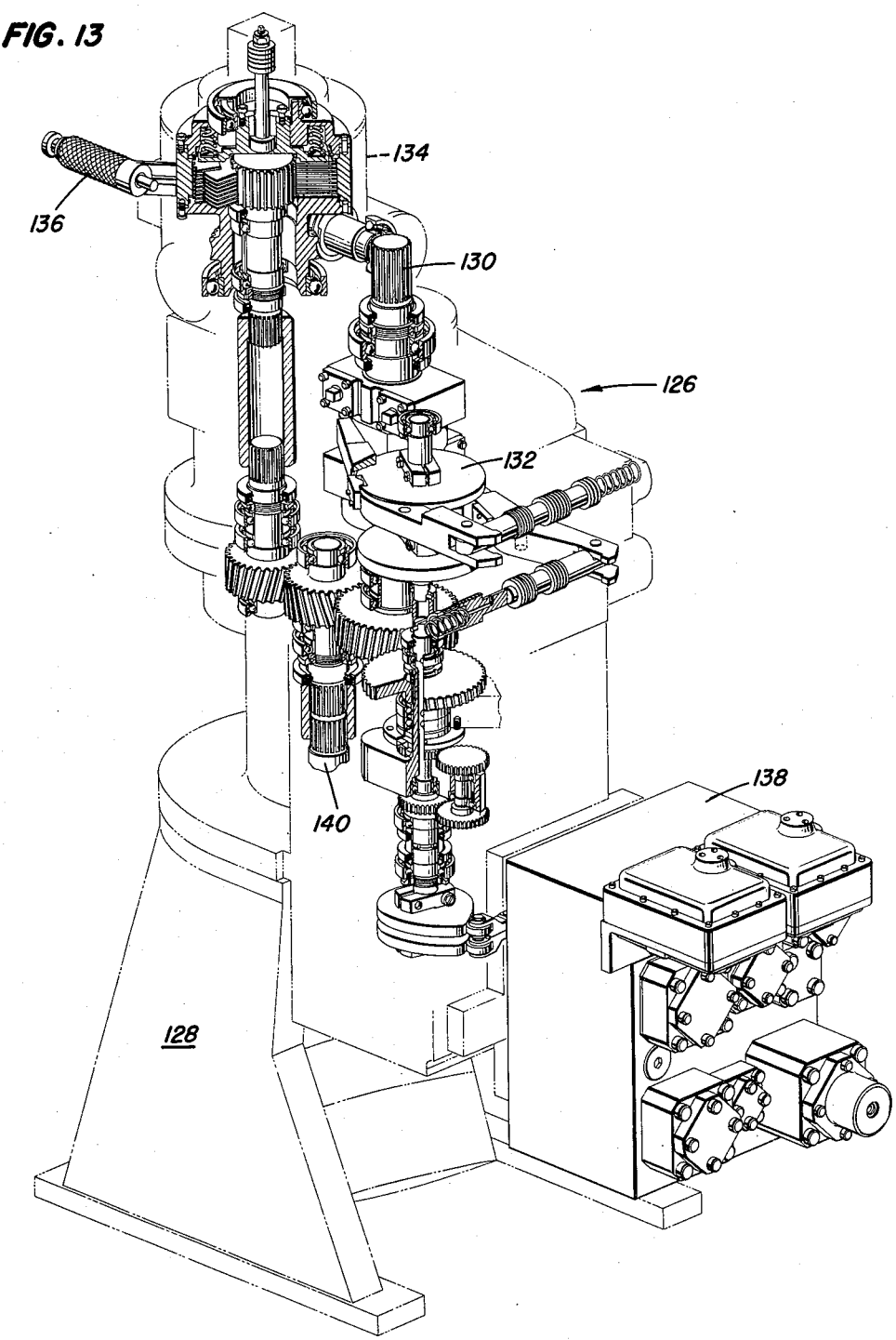
FIG. 13 is a diametric view, with parts removed, of the hoist drive.

The hoist system 28, shown in FIG. 12 is mounted vertically in the ready service ring truss 38 below the load or hoist station. The forward and aft shoe hoists 110 and 112 includes telescopic steel tubing which is moved by duel chains 118 sprocket driven by horizontal drive shafts 120. An intermediate drive shaft 122 extends downwardly from an upper transmission 124 which turns the shafts 120 to a hoist lower drive unit 126 mounted on a pedestal 128 located inside the truss 38. The lower end of the intermediate drive shaft 122 connects to a splined shaft 130 of the lower drive 126 as depicted best in FIG. 13.

The hoist lower drive 126 includes a latch assembly 132 which holds the forward and aft shoe hoists 110 and 112 in a lowered position or one of the two raised positions. A hoist power-off brake 134 with a handcrank 136 for manual operation of the hoist system 28 is mounted on top of the hoist lower drive 126 and a hydraulic control unit 138 is secured to one side. The lower drive is powered from a B-end unit inside of the pedestal 128, and it is connected to a vertical input shaft 140.

The top of the forward shoe hoist 110 is provided with a steel block 142 which is machined to engage the forward booster shoe of the missile-booster combination 26, which forward shoe hoist 110 is comparable to the forward booster shoe bracket 56 on the center bearing assembly 46 previously described. The aft shoe hoist 112 is provided with a machined steel head 144 shaped to engage the aft shoe, as shown in FIGS. 12 and 19.

Figure 16:
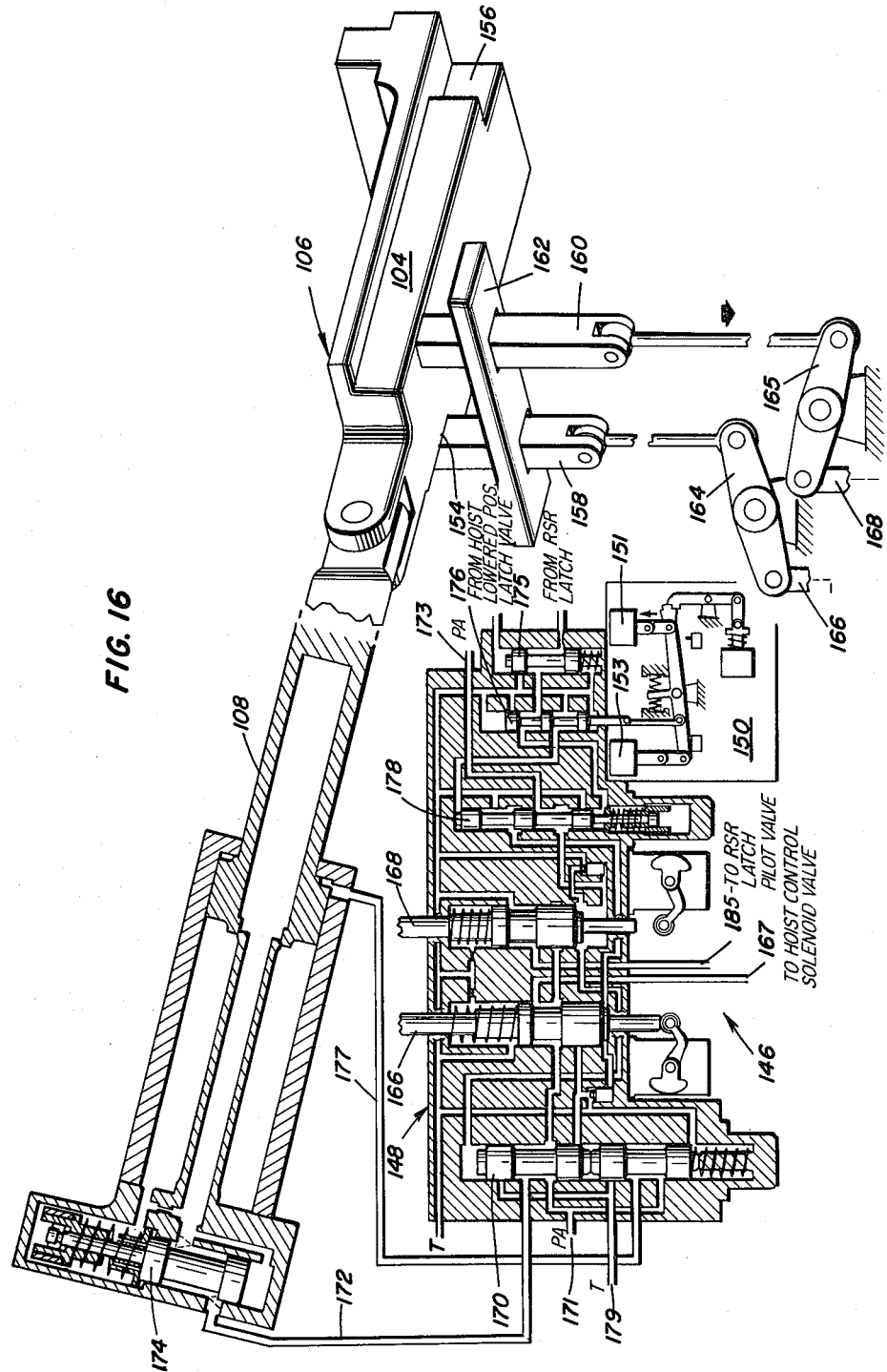
FIG. 16 is a hydraulic schematic, shown partly in perspective, of the tray shift control in the tray-to-hoist position.

As shown in FIGS. 8 and 16, the tray shift assembly 106 has a tray shift control 146 mounted directly below it which consists of a valve block 148 and a detented solenoid assembly 150. The protruding end of the piston 108 is hinged to the slide segment 104 which travels in a pair of tracks 152. It is the slide segment 104 which does the actual shifting of the tray 34.

The slide segment 104 is provided with two cutouts 154 and 156 for receiving extend and retract latch plungers 158 and 160, respectively. Plungers 158 and 160 are located in a fixed bracket 162 and are connected to links 164 and 165, respectively, which pivots on the fixed bracket 162, as best shown in FIG. 8. The links 164 and 165 in turn are connected to operating valves 166 and 168, respectively, in the valve block 148.

A selector valve 170 is provided in the valve block 148 and is connected by fluid conduits 172 to the tray shift piston 108 and to a metering valve 174 which is associated therewith.

To extend the tray to the hoist position, solenoid 151 is actuated, which moves solenoid valve 176 downward. When the ready service ring 20 is latched and the hoist system 28 is secured in its lowered position, the interlock valve 175 moves downwardly and permits hydraulic fluid to move into a solenoid valve 176 in its downward position and thence to a pilot valve 178, shifting it upwardly. Accumulator pressure can then pass through conduit 173 to the latch operating valve 168 moving it upwardly also. This action pushes the rocket arm type links 165 associated with the retract latch plunger 160 and moves the latter downwardly in the direction of the arrow, causing the slide segment 104 to be unlatched at cutout 156. Pressure fluid is then transmitted to the selector valve 170, which is then shifted downwardly. Accumulator fluid under pressure is then ported through conduit 171, between the lands of valve 170 and through fluid conduits 172 and 177 to both sides of the piston 108, which being of a differential area type, moves to extend the tray 34 to the hoist position.

Figure 17:
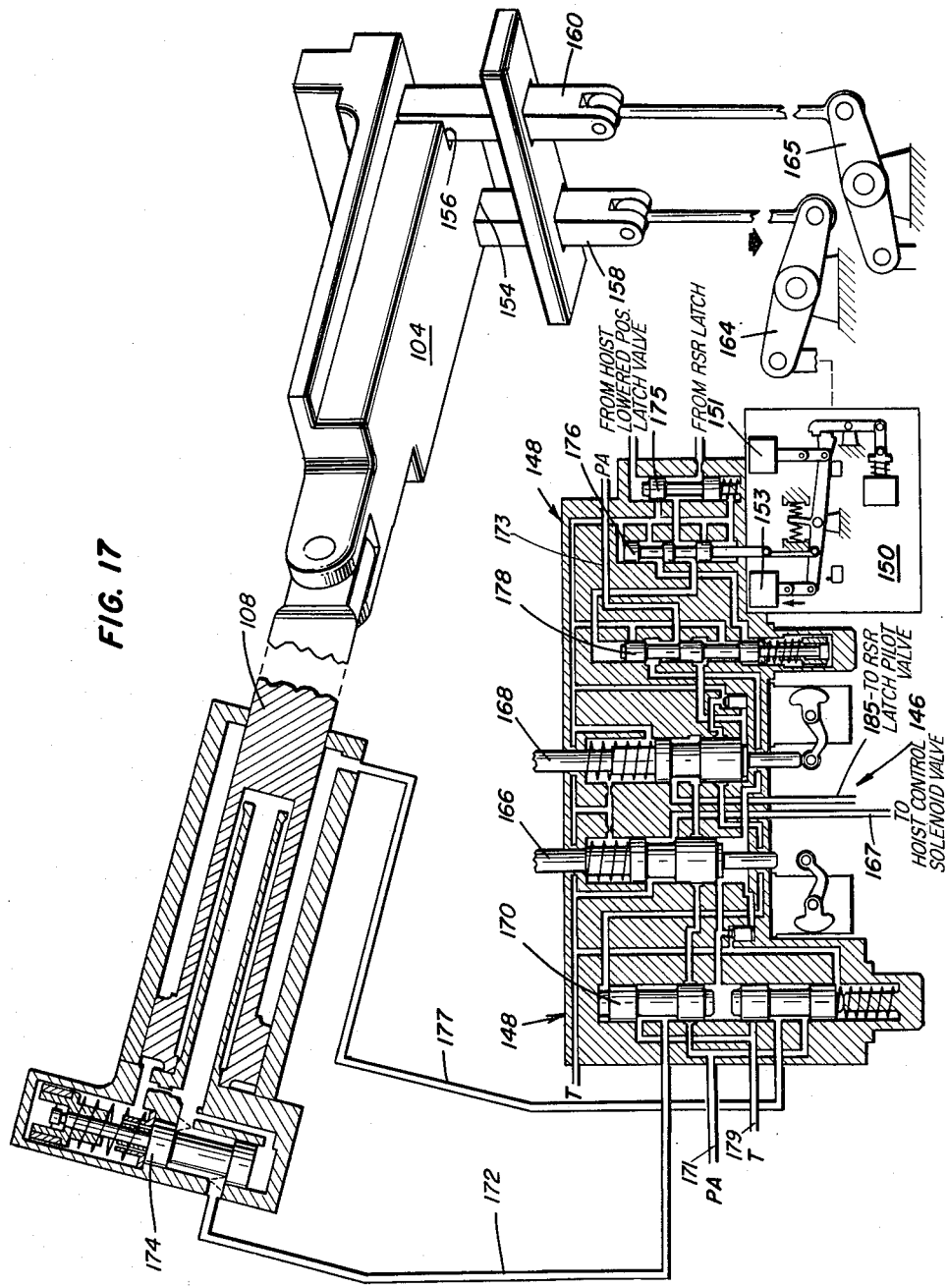
FIG. 17 is a view similar to FIG. 16 in which the tray shift control is shown in the tray-to-ready service ring position.

After the missile-booster combination 26 has been hoisted and the hoist system 28 has been lowered again, the tray 34 must be positioned to the ready service ring 20 by the energizing of the solenoid assembly 150 in the reverse direction as shown in FIG. 17, i.e., solenoid 153 must be actuated which moves valve 176 upward. As in the preceding cycle, the hoist system 28 must be latched in its lowered position in order to move the interlock valve 175 downwardly and permit pressure fluid to pass through the lower land of the solenoid valve 176, which is now in its upward position, to the top of the pilot valve 178, shifting it downwardly. This action ports PA through conduit 173 to the tray shift latch operating valve 166, thus moving it upwardly and unlatching the extend latch plunger 158 from the cutout 154 of the slide segment 104. The PA is then ported to the middle of valve 170 moving the upper portion in an upward direction. PA can then pass through conduit 171 to conduit 177 only, since PA to conduit 172 has been cut off by movement of valve 170. Piston 108 is, therefore, retracted. The pressure fluid displaced by this retraction operation of the piston 108 is then metered through the metering valve 174, through conduit 172, the upper land of valve 170 and through conduit 179 to tank T.

In order to initiate rotary movement of the ready service ring 20, it is necessary that its mechanism be unlatched. Unlatching of the mechanism is accomplished by energizing a solenoid assembly 180 as shown best in FIG. 15. This energization of the solenoid assembly 180 shifts a solenoid valve 182 and allows pressure fluid PA from conduit 185 of the previously mentioned tray shift latch valve block 148 to pass to one end of a pilot valve 184 while relieving the other end to tank T. Pilot valve 184 is shifted upward and PA is ported to the retract side of each right hand latch piston 186 of the index latches 88.

Figure 15:
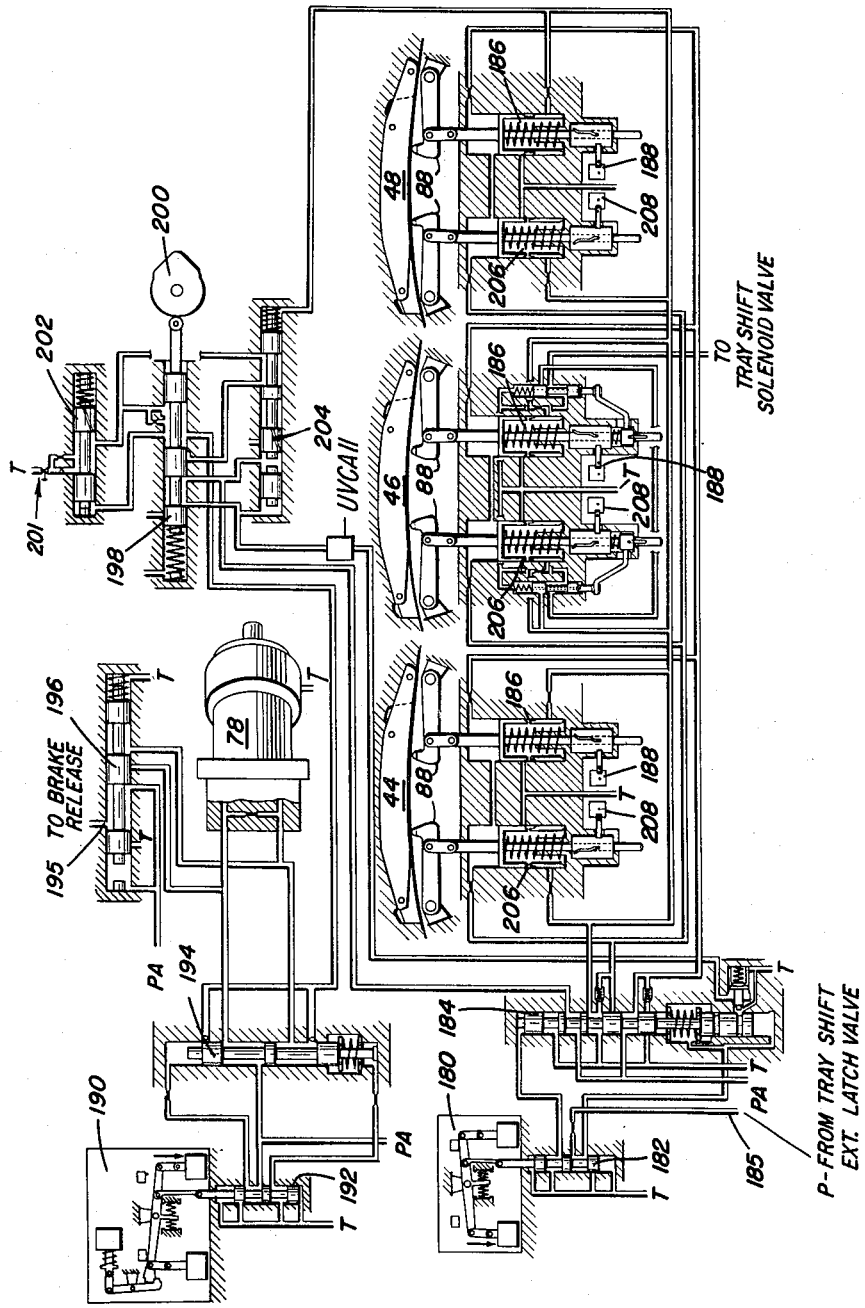
FIG. 15 is a hydraulic schematic of the ready service ring drive and control.

When these three latch pistons 186 are retracted, the corresponding right hand index notch 86 on each of the bearing assemblies 44, 46, and 48 is unlatched as shown best in FIG. 15. This actuates three interlock switches 188 and completes a series electrical circuit. Next, a solenoid assembly 190 shifts a solenoid valve 192. This allows pressure fluid to pass to shift pilot valve 194. Pressure fluid is then ported to the B-end unit 78. Accumulator pressure fluid PA is ported to valve 196 which shifted the valve and ports PA through conduit 195 to release the brake as explained in connection with FIG. 11.

Figure 11:
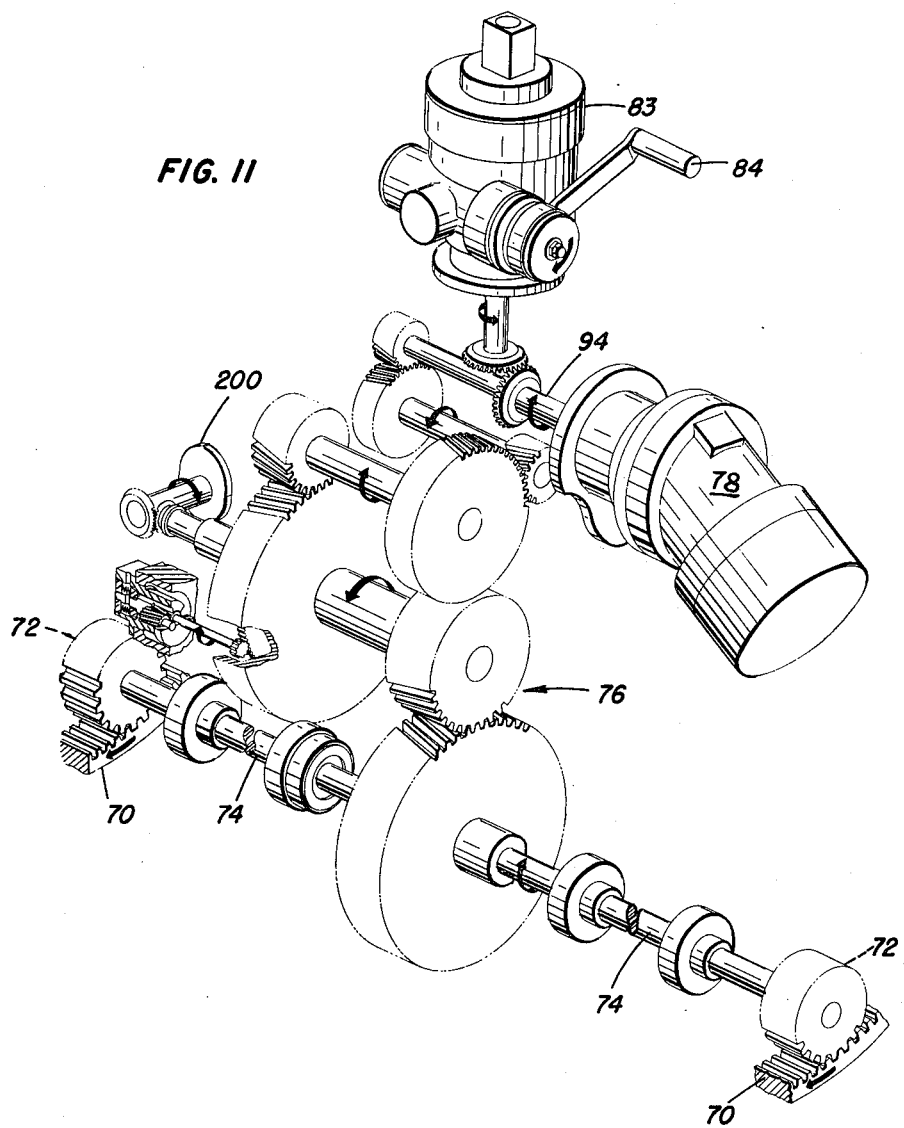
FIG. 11 is a schematic diagram of a ready service ring drive mechanism.

The discharge of fluid from the B-end unit 78 is then ported to a flow control valve 198. This flow control valve 198 also receives pressure fluid from pilot valve 184. Through the gear reduction assembly 76, the B-end unit 78 drives a cam 200 through a gear train as shown in FIG. 11, which moves the control valve 198.

As the cam 200 drives the valve 198 through its acceleration phase, fluid is ported to a metering valve 202 where it is metered to tank T, through throttle valve 201, thus controlling the flow through the B-end unit 78. At the completion of the acceleration portion of the travel of the ready service ring, the valve 198 continues to move for a short distance in order to operate a bypass valve 204. Left hand index latch pistons 206 are pushed downward as the left hand latches 88 are cammed out by the rotation of the ready service ring 20 to close three interlock switches 208.

A series of electrical circuits consisting of these three switches 208 and another switch (not shown) at either index station on either side of the hoist station is completed and the solenoid assembly 180 is de-energized so as to allow the pilot valve to return to a neutral position.

The tops of all latch pistons 186 and 206 are now ported to tank T but are held down by the camming face of bearing assemblies 44, 46, and 48 until the ready service ring 20 has completed one index cycle as determined by the control valve 198 and the operating cam 200. At the completion of the cycle of operation, the index latches 88 drop into index notches 86 and are prevented from retracting by ported pressure fluid against the bottom of their latch pistons 186 and 206.

To obtain the maximum advantages of the present invention, it is desirable to provide a means for recording and indicating the type and location of missiles on the ready service rings. Although it is possible to operate the system without such a means, it is necessary when fully automatic operation is desired. Copending application Serial No. 197,565, filed on May 22, 1962, discloses a load status recorder which is designed to present an indication of the condition of the ready service rings in the magazine and to relay the information to control panels in the form of actuations of interlock switches and visual light indications.

Referring now to FIGS. 1, 3, 4, 6, and 7 of the drawings, there is shown therein a typical magazine door arrangement for the guided missile launching system which door arrangement comprises a pair of magazine doors 210 and 218. These doors 210 and 218 are hinged so as to come into side contact when closed. The left door 210 is provided at its inboard edge with a continuous rigid latch bar assembly of the type disclosed in copending application, Serial No. 136,691, filed August 30, 1961.

Referring now to FIGS. 3 and 20, the receiving end portion of the overhead conveyor (tramway) type loader 32 is shown. By the previously mentioned hoist system 28 missile-booster combinations 26 are raised to this end of the loader 32 and are supported by the forward and aft shoes 316 and 318 engaging rails 516.

Floating tracks 310 and 312, such as the type disclosed in copending application, Serial No. 186,284, filed on April 19, 1962, now Patent No. 3,086,480, are provided and include the short section of the rails 516, and thereby provide for limited movement of the floating tracks relative to the fixed rail 516 in order to compensate for misalignment of the missile and the rails 516.

These floating tracks 310 and 312 and rails 516 are contoured to receive and support the booster shoes 316 and 318 when the missile-booster combination 26 is thrust into engagement therewith and while propelled therealong by a loader chain 520. Tapered entry elements are provided in the floating tracks 310 and 312, to receive shoes 316 and 318. As the hoist 28 rises, the booster shoes raise the floating tracks out of alignment with the rails 516 until the loader pawl 522 can slide the booster shoes from the hoist into the floating tracks. Then the hoist lowers, and the floating tracks lower into alignment with the rails 516.

The end of the loader chain 520 is equipped with a pawl 522 through which the drive force of the chain 520 is applied to the shoe 318. Both the pawl 522 and the chain 520 are provided with side rollers 524 which travel in a chain track of the rails 516 to prevent their buckling in thrust.

A pawl positioner 521 such as the type disclosed in copending application, Serial No. 205,806 filed on June 27, 1962, now Patent No. 3,111,911, issued November 26, 1963, is provided to position the pawl relative to the aft booster shoe 318 for engagement therewith.

The typical missile-booster combination 26, as shown in FIG. 20 is handled and transported by means of the forward and aft launching shoes 316 and 318 secured, respectively, forward and aft of the booster 320 of the weapon 26. The greater part of the weight of the weapon 26 is supported by the forward shoe 316 which is shaped to glide horizontally along the tracks of the conveyor or loader 32 as previously described.

The aft shoe 318 of the booster 320 engages and moves on the track of the loader 32 and additionally serves as the attachment point for the drive chain 520 and pawl arrangement therefor. Directly behind the aft launching shoe 318, each booster 320 is provided with a plurality of warm-up contact points 618, which electrically connect to the various electronic components of the weapon 26.

A warmup contactor of the type disclosed in copending application, Serial No. 106,421, filed on April 27, 1961, now Patent No. 3,080,792, is adapted for making connection to these contact points 618 and for engaging the aft launching shoe 318.

The warmup contact 620, as shown in FIG. 20, is provided with a plurality of contact fingers 692 which correspond to the number and location of the contact points 618 on the booster 320. The contact fingers 692 are electrically connected to a warmup cable 710 which is, in turn, connected to an electrical source. A cable reel 810 of the type disclosed in copending application Serial No. 126,430, filed on July 12, 1961, now Patent No.

3,084,602, is provided on the conveyor trunk 32 and is geared to the chain drive for taking in and playing out the cable 710 as the chain 520 is transported to move the missile-booster combination 26. Thus, electrical power can be supplied to the missile-booster combination 26 as it is being transported along the conveyor trunk 32.

Referring now to FIGS. 1 and 2, the retractable spanning rail is designated generally by reference numeral 910. This spanning rail 910 is part of the loader 32 of the missile weapon feeder for the guided missile launching system, which is intended to extend and retract through a door frame 914 provided in an opening in the bulkhead of a deckhouse 916. In extending, the spanning rail 910 opens a pair of blast doors 918 and bridges the gap between the stationary loader trunk 32 and one guide arm 920 of the dual arm missile launcher 90.

In practice, two loaders 32 forming the missile feeder with their associated spanning rails 910 and blast doors 918 are used so that both guide arms 920 of the duel launcher 90 may be loaded at one time, either simultaneously or alternately. For the purpose of this invention, however, it is necessary to describe only one of the loaders 32 briefly.

Missile weapons 26, consisting usually of the missile and a booster connected thereto to form the missile-booster combination or weapon 26, are suspended by the spaced fore and aft shoes 316 and 318 and moved on the rails 926 on these launcher guide arms 920 on the previously mentioned similar rails 516 provided on the loader 32 and the spanning rail 910, which are all in continuous alignment when the latter is extended as shown in the right-hand feeder system of FIG. 1. The retractable spanning rail and blast door arrangement is described in detail in copending application Serial No. 119,259, filed on June 21, 1961, now Patent No. 3,101,026. The blast doors 918 are provided with a seal of the type disclosed in copending application, Serial No. 106,422, filed on April 27, 1961.

There is shown in FIG. 21 a skeletonized cutaway of one guide arm 920 of a launcher 90, which arm is provided with a booster contactor designated generally by reference numeral 1110, booster squib ignitor contacts designated generally by reference numeral 1310, and a turret arming device designated generally by reference numeral 1410.

The booster contactor 1110, which is of the type disclosed in copending application Serial No. 174,325 filed on February 19, 1962, is adapted to contact the contactor pad 1148 on the booster 320 and provide electrical power to the booster 320 while the missile-booster combination 26 is on the launcher guide arm 920.

The turret arming device 1410 consists basically of a mechanism which arms an igniter in the booster 320 of the missile-booster combination 26, and may be, for example, of the type set forth in copending application Serial No. 153,766, filed on November 20, 1961.

A spaced pair of jettisoning or ejector devices 1610, shown in FIG. 22, are spaced about the guided missile launcher 90, each being set into a deck 1614 of a ship. Each ejector device 1610 is installed at an angle to the deck 1614, with the top end of each ejector device 1610 being covered by a protective housing 1616 which protrudes above the deck 1614.

Each ejector device 1610 which, for example, may be of the type disclosed in copending application Serial No. 139,581, filed on September 19, 1961, now Patent No. 3,093,034, is comprised essentially of a coaxial arrangement of a long cylinder 1618 which contains a positioned cylinder 1630 as illustrated best in FIG. 22. A long piston rod 1622 is located in each cylinder 1630.

The end of the piston rod 1622 above the deck 1614 is provided with a bumper disc 1624 having a spherical segment shape to permit uniform contact with various diameter booster nozzles. The disc 1624 is ball socketed to the end of the piston rod 1622 so as to have a limited tilting freedom and provide self-sealing against the housing 1616 where it serves as a weather cover when the ejector device 1610 is stowed. This same tilting freedom of the disc 1624 provides good seating in thrust against the booster end of a missile-booster weapon 26 when the piston rod 1622 is extended pneumatically in a jettisoning operation thereon.

In preparing to jettison a dud missile-booster weapon 26, the launcher 90 is slewed and its guide arm 920 is elevated until the dud missile-booster weapon 26 is in alignment with the ejector devices 1610 for that arm. Compressed air is then ported into the cylinder to extend piston rod 1622 and jettison the dud weapon 26.

OPERATION

Assuming the ready service rings 20 each contain a plurality of missile-booster combinations 26 and further assuming that the desired missile is located at the load station, i.e., over the hoist assembly as shown in FIG. 4, operation of the missile launching system of the present invention would be initiated by opening the magazine doors 210 and 218. The tray shift assembly 106 is then actuated, shifting the tray 34 at the load position which disengages the booster 320 from the ready service ring 20 and engages it with the hoist system 28. The missile combination 26 is then raised through the open magazine doors to the loader 32. The warmup contactor 620 is extended at the end of the hoist stroke to contact the booster 320 and the pawl 522 engages the aft booster shoe 318. The loader pawl positioner 521 extends, transferring the booster shoes from engagement with the hoist to engagement with the loader. The hoist is then lowered and the magazine doors are closed, while the wings and fins are manually attached to the missile and booster. The blast doors 918 open and the spanning rail 910 extends to contact the launching guide arm 920 on the launcher 90. The missile is then moved by means of pawl 522 and chain 520 onto the launcher arm 920 and the aft shoe latch extends. The arming tool 1410 extends to engage the igniter in the combination 26. The booster contactor 1110 extends to contact the booster to continue warmup of the electronic circuits of the missile-booster combination. The loader pawl is retracted after which the blast doors are closed and the spanning rail retracted. The launcher 90 is then trained and elevated to the desired orientation and the arming tool arms the booster.

After the hoist assembly 28 is lowered and the magazine doors are closed, the ready service ring can be rotated or indexed to bring the next missile to the load station. After the blast doors have been closed, the magazine doors can be opened and the aforementioned next missile can be raised, the fins and wings attached. Once the first missile has been launched, the next missile will be ready to be moved onto the launcher arm.

It should be apparent that both ready service rings and both loaders can be used simultaneously to load both arms of the launcher or they can be used alternately. In the event a missile is not launched after it is loaded onto the arm, it is possible, by reversing the loading procedure, to return the missile to the ready service ring.

Obviously many modifications and variations of the present invention are possible in the light of the above teachings. It is, therefore, to be understood that within the scope of the appended claims the invention may be practiced otherwise than as specifically described.

What is claimed is:

A missile launching and handling system comprising, in combination, a magazine containing a ready service ring having a generally cylindrical configuration, rotatably and horizontally mounted therein, means for selectively rotating said ring, a plurality of missile trays attached to the periphery of said ring parallel to the longitudinal axis of said ring, a hoist assembly in said ring adapted to raise and lower a selected missile from and to a predetermined position on the periphery of said ring, a transporting compartment positioned adjacent to and above said magazine, a magazine door interposed between said compartment and said magazine and positioned directly above said hoist assembly, said magazine door being adapted to be opened when said hoist is raised and closed when said hoist is lowered, a launcher located outside of and adjacent to said compartment, an arm having a guide rail on said launcher, a fixed overhead rail located in said compartment in alignment with said magazine door, said fixed overhead rail extending from a point directly above said hoist assembly to a point near said launcher, said fixed overhead rail being engaged by and supporting the missile from above when the missile is in raised posion, a retractable spanning rail attached to said fixed overhead rail near said launcher and axially alignable with said fixed overhead rail and bridging the space between said guide rail and said fixed overhead rail when said spanning rail is in extended position, a blast door on said compartment providing access between said launcher and said transporting compartment, means coupling said blast door to said spanning rail whereby said blast door is opened when said spanning rail is in extended position and closed when said spanning rail is in retracted position and a retractable rammer mounted in a manner to advance a missile along said fixed overhead rail, said spanning rail and onto said launcher.

References Cited by the Examiner

UNITED STATES PATENTS

| | | | |
|---|---|---|---|
| 2,831,399 | 4/1958 | Meekins et al. | 89—1.7 |
| 2,920,534 | 1/1960 | Lowery | 89—1.7 |
| 2,985,072 | 5/1961 | Carlberg et al. | 89—1.7 |
| 3,054,330 | 9/1962 | Carlberg | 89—1.7 |
| 3,080,792 | 3/1963 | Johnson | 89—1.7 |
| 3,086,423 | 4/1963 | Chamberlin et al. | 89—1.7 |
| 3,086,480 | 4/1963 | Johnson et al. | 89—1.7 |
| 3,093,034 | 6/1963 | Wermager et al. | 89—1.7 |
| 3,095,780 | 7/1963 | Bauer et al. | 89—1.7 |
| 3,101,026 | 8/1963 | Jacobson et al. | 89—1.7 |

BENJAMIN A. BORCHELT, *Primary Examiner.*

S. W. ENGLE, *Assistant Examiner.*